United States Patent [19]

Sarradin

[11] Patent Number: 5,387,784
[45] Date of Patent: Feb. 7, 1995

[54] PORTABLE PAYMENT TERMINALS AND NETWORK FOR SUCH TERMINALS

[75] Inventor: Jean-Louis Sarradin, Fontenay en Parisis, France

[73] Assignee: Societe d'Applications Generales d'Electricite et de Mecanique Sagem, France

[21] Appl. No.: 163,587

[22] Filed: Dec. 7, 1993

Related U.S. Application Data

[63] Continuation of Ser. No. 786,639, Oct. 25, 1991, abandoned.

[30] Foreign Application Priority Data

Oct. 30, 1990 [FR] France .................. 90 13449

[51] Int. Cl.⁶ .............................................. G06K 5/00
[52] U.S. Cl. ........................... 235/380; 235/381
[58] Field of Search ............ 235/375, 379, 380, 381, 235/382, 382.5, 383, 385, 432, 462, 470, 472

[56] References Cited

U.S. PATENT DOCUMENTS

| | | | |
|---|---|---|---|
| 3,727,186 | 4/1973 | Stephenson, Jr. et al. | 340/825.33 |
| 4,415,065 | 11/1983 | Sandstedt | 235/383 X |
| 4,482,802 | 11/1984 | Aizawa et al. | 235/379 |
| 4,506,148 | 3/1985 | Berthold et al. | 235/380 |
| 4,569,421 | 2/1986 | Sandstedt | 235/383 X |
| 4,575,621 | 3/1986 | Dreifus | 235/380 |
| 4,601,011 | 7/1986 | Grynberg | 380/23 |
| 4,746,787 | 5/1988 | Suto et al. | 235/379 |
| 4,850,009 | 7/1989 | Zook et al. | 235/375 X |
| 4,857,716 | 8/1989 | Gombrich et al. | 235/462 |
| 4,916,441 | 4/1990 | Gombrich | 235/380 X |
| 4,947,028 | 8/1990 | Gorog | 235/381 |
| 5,003,472 | 3/1991 | Perrill et al. | 235/375 X |
| 5,149,947 | 9/1992 | Collins, Jr. | 235/462 |
| 5,208,446 | 5/1993 | Martinez | 235/380 |

FOREIGN PATENT DOCUMENTS

| | | |
|---|---|---|
| 0079047 | 5/1983 | European Pat. Off. |
| 0159539 | 10/1985 | European Pat. Off. |
| 0168836 | 1/1986 | European Pat. Off. |
| 2192665 | 1/1988 | United Kingdom |
| 8504035 | 9/1985 | WIPO |
| 9003016 | 3/1990 | WIPO |
| 9004239 | 4/1990 | WIPO |

Primary Examiner—David C. Nelms
Assistant Examiner—John R. Lee
Attorney, Agent, or Firm—Rosenman & Colin

[57] ABSTRACT

A point-of-transaction system for processing electronic payments of transactions includes portable payment terminals, each having a keyboard for entering transaction data and an interface for communicating without wires with a distant central station and, in turn, to a processing center in telephone communication with the central station.

9 Claims, 2 Drawing Sheets

PORTABLE PAYMENT TERMINALS AND NETWORK FOR SUCH TERMINALS

This application is a continuation of application Ser. No. 07/786,639, filed Oct. 25, 1991, now abandoned.

BACKGROUND OF THE INVENTION

A payment terminal is used for electronic payments by card for effecting a transaction between a retailer or any other business person, the holder of the terminal, and a customer, the bearer of a payment medium, such as a bank card, with a memory or magnetic stripe, or a cheque, and which, in order to validate the transaction, can enter on the terminal a confidential code which is peculiar to it after the holder of the terminal has in particular entered the amount of the transaction. Such a terminal being considered as a slave, the transaction can then be transmitted to a master which retransmits it, over the switched telephone network STN or a dedicated network such as the TRANSPAC network, to a retailer processing centre RPC.

Payment terminals are already known, for example through the document U.S. Pat. No. 4,601,011, each having a module for entering data and a communication module, connected by cables to a central station and organized as a clustered system—the communication modules for all the terminals are connected to the central station by a single bus—or as a pooled system—the communication modules for the terminals are connected individually to the central station. These cable systems have the double disadvantage of comprising non-portable terminals, whose position is fixed, and having to lay cables, which is truly a disadvantage when such a cable system has to be installed in a place of sale which has already been fitted out or when the cash point has to be moved.

The need for having portable payment terminals is obvious for some business people who are anxious not to require their customers to move in order to enter their confidential code. Restaurant owners can be cited in particular. Considering only the latter it is eminently preferable for the restaurant waiters to present the terminal to a customer at the restaurant table rather than to ask him to go to the till.

Portable payment terminals are also known, having a module for entering data and in interface for communicating by means of infrared signals with a central station acting in fact as a functional pedestal or base for each terminal. Each terminal is powered independently by batteries and stores the transactions temporarily before transferring them to the storage memory in the base for subsequent transmission to an RPC centre. These terminals, admittedly mobile, nevertheless also have two drawbacks. Communication between them and their associated base, although effected by means of infrared signals, is enabled only if they are placed on the base, a prior condition for the initialization of the infrared transmission. From this drawback relating to the mechanical initialization stems the second, by which, since the terminals are isolated from their base during transactions, interrogation by them in order to request authorization for the transaction, for example, is impossible. The document EP-A-168 836 discloses a terminal of the latter type, but which is neither portable nor mobile. More precisely, the terminal in this document provides only some of the functions necessary for the transaction, the other functions being provided by the payment medium. The terminal in this document does not allow any use of bank cards on issue at present.

SUMMARY OF THE INVENTION

The present invention therefore aims to propose a portable payment terminal allowing communication with the central station during transactions and which does not have the drawbacks of the terminals in the cable systems.

To this end, the present invention relates to a portable payment terminal comprising means for entering transaction data, an interface for communicating without wires with a remote central station, connected to a processing centre, and with electronic initialization and means for communicating, during the transaction, with the central station.

In spite of its simplicity, the present invention nevertheless entails an inventive activity.

Starting from a terminal in a cable system, the invention has consisted of substituting for the cable link a link without wires, substituting for the non-portable fixed terminal of the cable system a terminal which is mobile and portable but which has an interface for transmission without wires (by infrared) and with mechanical initialization, substituting for the communication interface of the mobile terminal of the prior art an interface for communicating without wires with the distant central station and with electronic initialization, readopting from the fixed terminal its means for communicating with the central station during the transaction, without mentioning adapting the central station to communication without wires.

Starting from the mobile terminal of the prior art, the invention has consisted of substituting for its communication interface an interface for communicating without wires with the remote central station and with electronic initialization, adopting from the fixed terminal of the cable system its means for communicating with the central station during the transaction.

In both cases, at least two steps have had to be taken in order to pass from the prior art to the terminal of the invention.

As a link without wires between the terminal of the invention and its associated central station, it is possible to propose for example an infrared link, a Hertzian wave link, etc.

The terminal of the invention can be connected to the central station in an on-line mode or in an off-line mode.

In the first case of the on-line mode, the transactions are not stored in the terminal but are transferred to the central station in the presence of the customers. They entail a request from the terminal to the central station and then a response from the central station to the terminal in order to end and validate them. The transactions may be preceded by a transaction authorization request which takes place as follows: the terminal sends a request to the central station, which transmits it to an authorization centre AC, either regional or national, before the terminal receives the response from the central station. The exchanges between the central station and the authorization centre take place in accordance with the well-known specifications of the organization of bank card issuers.

Still in the case of the on-line mode, it is possible to check, during a transaction, whether the bearer of the payment card has previously carried out other transactions at other transaction points, also equipped with a terminal, at the same place of sale, since the central station for the place of sale under consideration, to which all the portable terminals are connected, stores all the transactions for all the portable terminals which are associated with it. This check on any previous transactions takes place by means of a comparison, in the central station, with all the transactions stored. This is one of the checks made by the central station upon a request from the terminal before validation of the transaction and the response from the central station to the terminal.

In the second case of the off-line mode, each terminal stores its transactions and transfers them to the central station for example only once a day before remote gathering by the RPC centre. Also once a day, the central station transfers to the portable terminals a list of cancelled numbers (drawn up as a result of losses, theft and misuse).

It will be noted that in off-line mode, since the transactions are not immediately transferred to the central station, it is not possible to check any previous transactions by the same bearer at other portable terminals connected to the same central station.

The on-line mode is very suited to private networks of the type which are installed in places of sale known as "hypermarkets" and in restaurants. The off-line mode is well suited to public networks of the radiotelephony type, for example the Pointel system used by the France Telecom company based on the British specification MPT 1325 "Common Air Interface", May 1989. The Pointel network has a central station and a network of fixed public relay points with which are associated mobile terminals in the form of personalized handsets which, within a given radius, for example 200 m, around the points, makes it possible to communicate with the central station. However, the said specification can also be used for a private network with on-line terminals.

The applicant also intends to claim a network of several terminals like that of the invention.

BRIEF DESCRIPTIONS OF THE DRAWING

The invention will be understood better by means of the following description of the preferred embodiments of a portable payment terminal of the invention and the associated central station, with reference to the accompanying drawing, in which FIG. 1 is a diagram of the system in which the terminal is fitted;

DETAILED DESCRIPTION OF THE PREFERRED EMBODIMENTS

Figure 1:
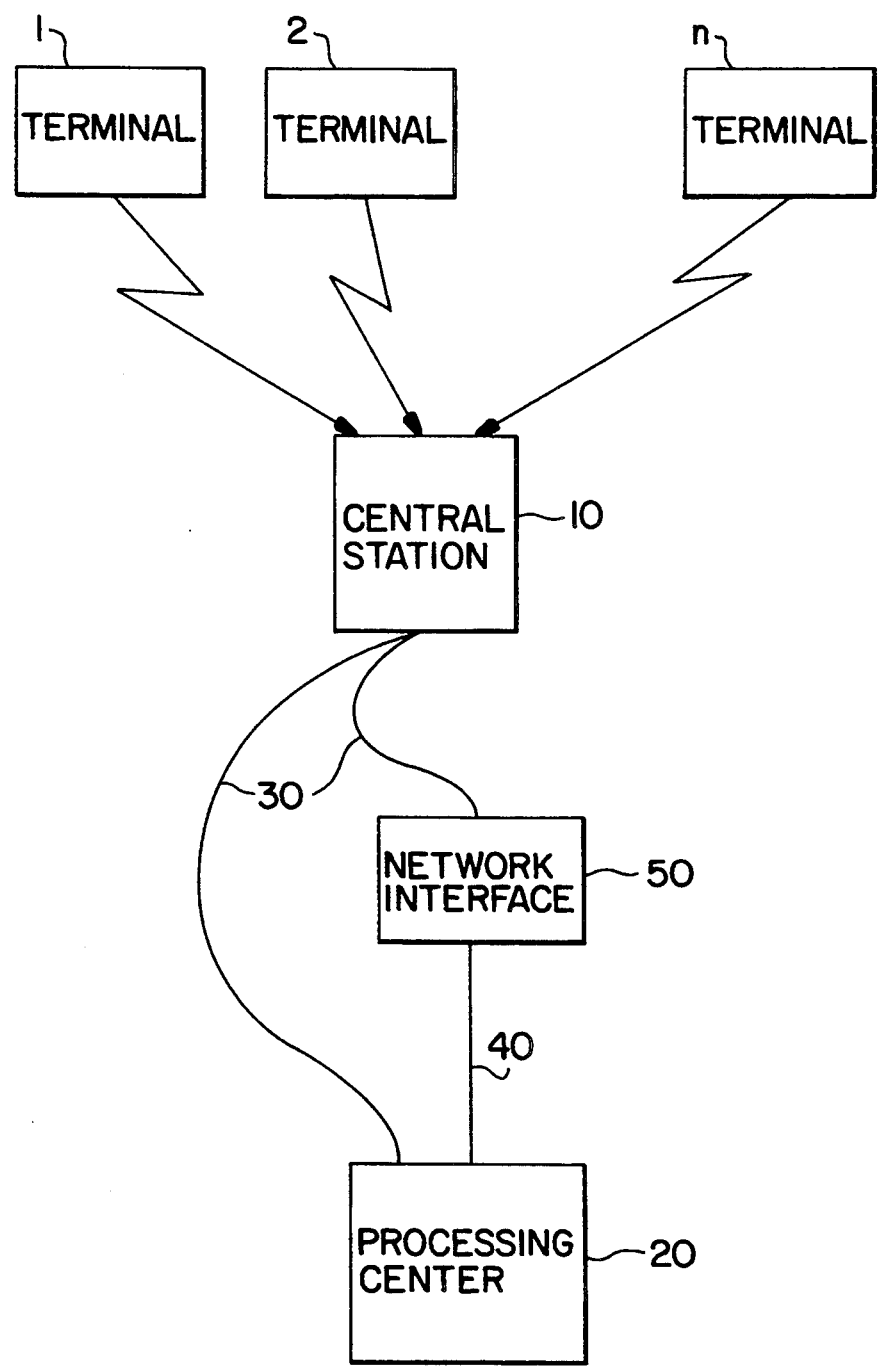

The terminal 1 which will be described forms part of a series of identical terminals 1, 2 . . . n connected by radio link, of the telephonic type, to a central station 10 itself connected here to a "retailers" processing centre" RPC 20. The link between the central station 10 and the RPC centre can be effected either by means of the switched telephone network STN 30, or by means of a dedicated network 40, for example of the TRANSPAC type, itself again connected to the STN network by a PAD interface 50. This is therefore in this case a configuration referred to as pooled.

The terminal 1 has, around a microprocessor 70, a display unit 71, a keyboard 72, a power supply battery 73, a memory board processing module 74, a module 75 for reading the magnetic stripe on magnetic cards, a program memory 76, a transaction memory 77, an input-output module 78 and an interface 79 for communicating with the central station 10.

In off-line mode, the transaction memory 77, which in this case is a backed up RAM, stores the transactions and the list of cancelled numbers. In on-line mode, the memory 77 is a working memory for each transaction in progress and which, according to the program of the memory 76, can if necessary store the preceding transaction in order to be able to supply a duplicate voucher without having to send a request to this effect to the central station.

The program memory 76 can be a PROM, with a fixed program, or a flash PROM or backed up RAM, with a program which can be remotely loaded from the central station.

The interface 79 makes possible a Hertzian wave link with the central station 10, electrically initialized in a conventional manner, either from the terminal itself or from the central station.

The microprocessor 70, the program memory 76 and the transaction memory 77 constitute, with the interface 79, the means of communication with the central station 10. The keyboard 72, the microprocessor 70 and the memories 76, 77 constitute the means of entering transaction data.

The input-output module 78 enables peripherals such as a cash register or cheque reader to be connected to the terminal.

Figure 2:
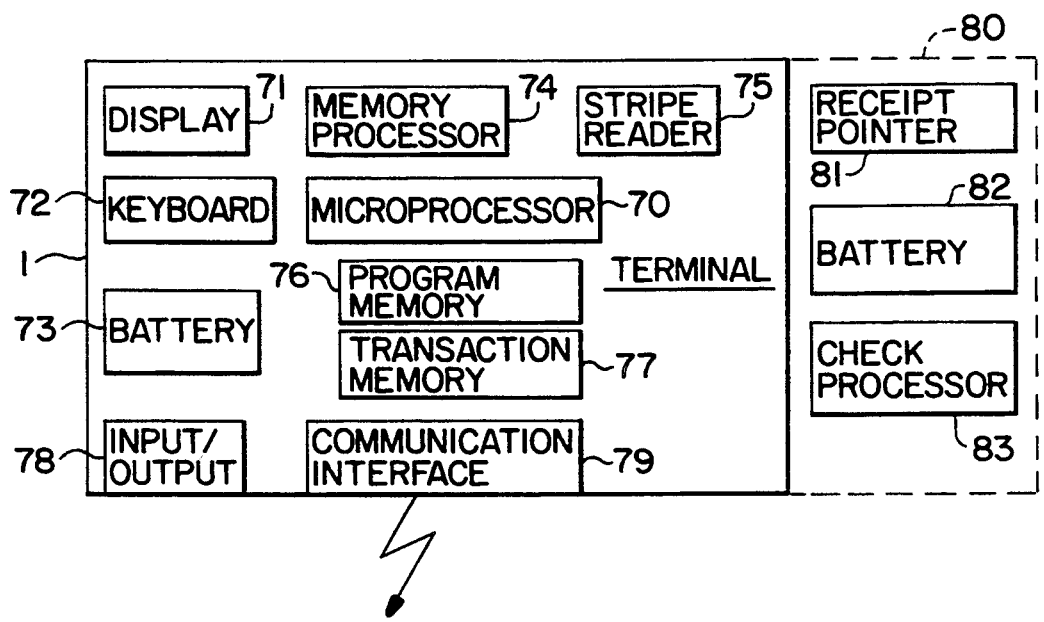
FIG. 2 is a diagrammatic representation of the terminal.
Figure 3:
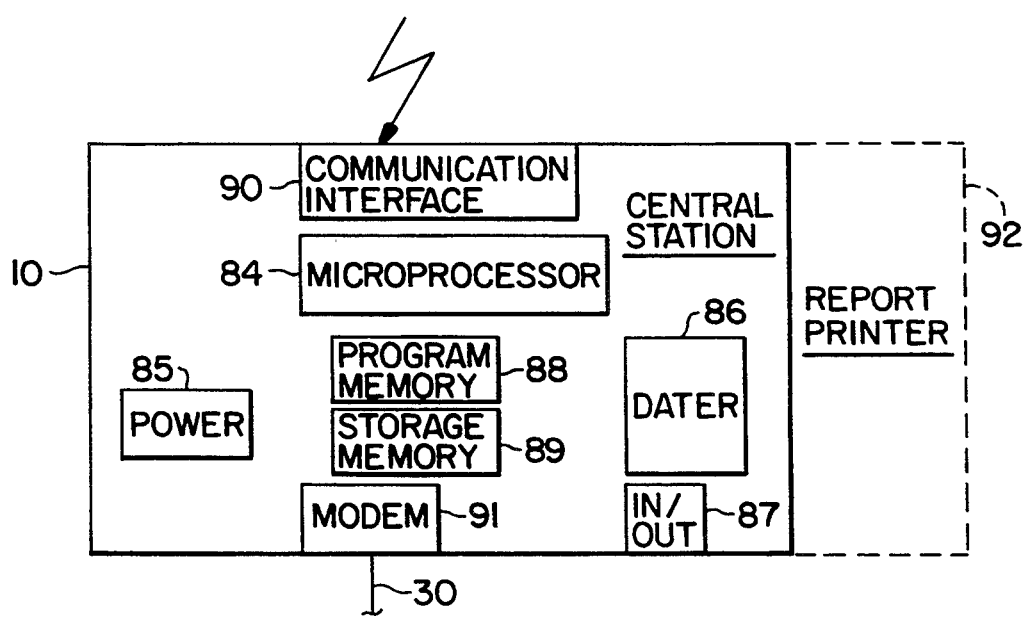
FIG. 3 is a diagrammatic representation of the central station.

As an option, as shown in broken lines in FIG. 2, an additional package 80 including a sales slip printer 81, with its battery 82, and optionally a cheque processing module 83, can be associated with the terminal 1.

It will be noted that the terminal 1 can also be powered directly from the mains.

The central station 10 has, around a microprocessor 84, a power supply unit 85, a dater 86, a peripherals input-output module 87, a program memory 88, a storage memory 89, an interface 90 for communicating with the terminal 1 and the other terminals in the network and a modem 91 for connecting to the STN network.

The central station manages all the portable terminals which are associated with it. There may for example be twenty or so of them. The management functions make it possible to implement in particular the transfer, from the terminals, of the transactions, one by one or all together, the transaction authorization requests, any verifications of previous transactions, but solely in on-line mode, requested by the terminal 1 by means of its microprocessor 70 and its memories 76, 77. For the RPC centre, it is the central station which provides the remote gathering of the transactions. It is also the central station which receives, for the entire network, the list of cancelled numbers in order to transmit it, in off-line mode, to the terminals.

It will be noted that the power supply unit 85 for the central station can also serve to charge the battery (73) for the terminals.

As with the terminals, an additional package 92, including for example a report printer, can optionally be associated with the central station 10.

The input-output module makes it possible to connect to the central station, for example, a central cash register, a cheque reader or a personal computer.

I claim:

1. A point-of-transaction system for processing electronic payment of a transaction, comprising:
   (a) a plurality of electronic payment media, each unique to an individual customer;
   (b) at least one portable payment terminal, each including
      means for identifying a payment medium presented by a customer to a respective terminal,
      means for manually entering data relating to the transaction, and
      means for generating and for broadcasting by wireless communication a payment authorization request signal during the transaction;
   (c) a central station remote from, and in wireless communication with, each terminal; and
   (d) a processing center remote from, and in communication with, the central station, said center including
      means for validating during the transaction the authorization request signal transmitted by the respective terminal via the central station to the center, and
      means for communicating during the transaction the validated request signal via the central station to the respective terminal to complete the transaction.

2. The system according to claim 1, wherein the payment media are credit cards, each bearing a stripe having magnetically encoded data; and wherein the identifying means is a magnetic stripe reader on the terminal.

3. The system according to claim 1, wherein the entering means is a keyboard having keys.

4. The system according to claim 1, wherein each terminal has an on-board power supply, and a display powered by the power supply for displaying information relating to the transaction.

5. The system according to claim 1, wherein the request signal generating means includes a microprocessor and a program memory for running a program, said program including means for storing data relating to previous transactions.

6. The system according to claim 1, wherein each terminal includes means for printing a receipt of the transaction.

7. The system according to claim 1, wherein a plurality of said terminals is provided, and said central station is in wireless communication with all the terminals.

8. The system according to claim 1, wherein said processing center is in telephonic communication with said central station.

9. The system according to claim 7, wherein said processing center is in telephonic communication with said central station.

* * * * *